Feb. 4, 1958 E. C. JONES 2,822,442
ELECTRIC SWITCHES AND OPERATING MEANS THEREFOR
Filed Feb. 2, 1956 3 Sheets-Sheet 3

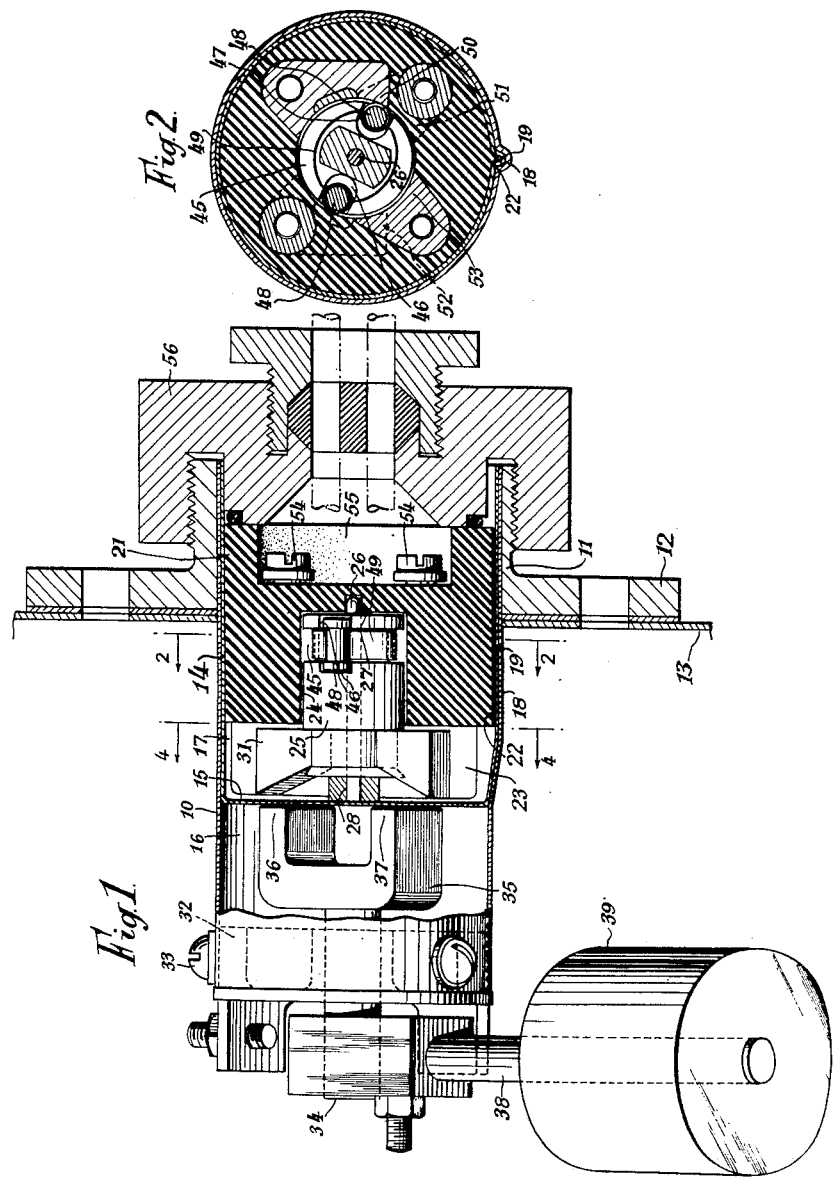

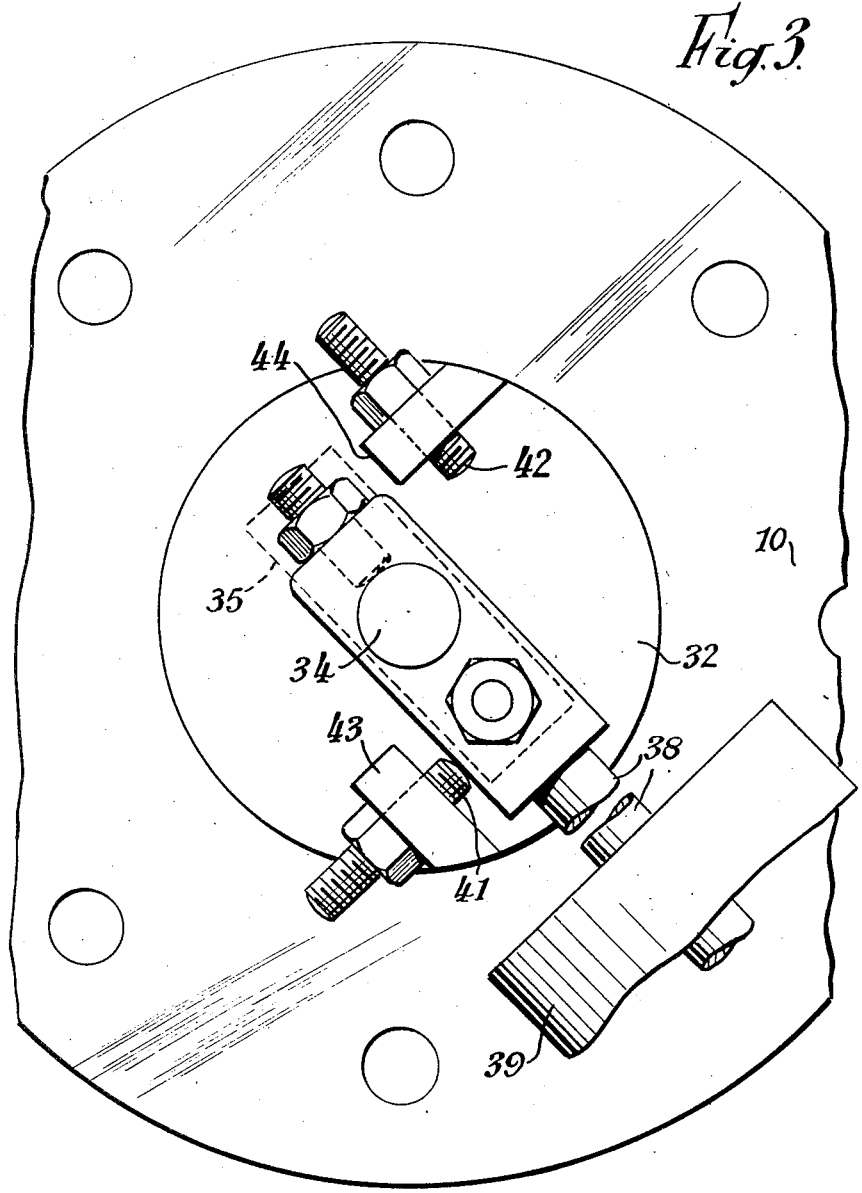

INVENTOR
ERIC CYRIL JONES
BY Watson, Cole, Grindle
& Watson ATTORNEYS

United States Patent Office 2,822,442
Patented Feb. 4, 1958

2,822,442

ELECTRIC SWITCHES AND OPERATING MEANS THEREFOR

Eric C. Jones, Tarrant Rawston, near Blandford, England, assignor to Flight Refueling Incorporated, Baltimore, Md., a corporation Application February 2, 1956, Serial No. 563,143

Claims priority, application Great Britain February 3, 1955

7 Claims. (Cl. 200—87)

This invention relates to electric switches and to operating means for such switches.

One object of the invention is to provide rotary snap action of an electric switch, and another object is to provide a simple form of rotary switch having a snap action and operable by a float or other member responsive to variations of a condition such as the liquid level in a tank.

According to the invention, an electric switch mechanism comprises a rotary switch and a magnetic coupling device through which the switch is operated, the magnetic coupling device comprising a magnet element and an armature element movable about co-axial pivots, an operating member coupled to one element of the magnetic coupling device to effect rotation thereof through a predetermined angle, a rotor forming part of the rotary switch and coupled to the other element of the magnetic coupling, and means for limiting the angular movement of the said other element, the two elements of the magnetic coupling moving about mean positions at right angles to each other.

Further, according to the invention, an electric switch mechanism includes a switch rotor carrying one or more contacts adapted to bridge stationary contacts in a casing, the rotor having fixed to it one element of a magnetic coupling device the other element of which is moved by a float or other operating device to so control the relative positions of the magnet and armature that the rotor is turned with a snap action through a limited angular movement.

The invention is hereinafter described with reference to the accompanying drawings, in which:

Figure 1 is a side elevation, partly in section, of one form of switch mechanism according to the invention;

Figure 2 is a cross-section on the line 2—2 of Figure 1;

Figure 3 is an end view looking from the left in Figure 1;

Figure 4:
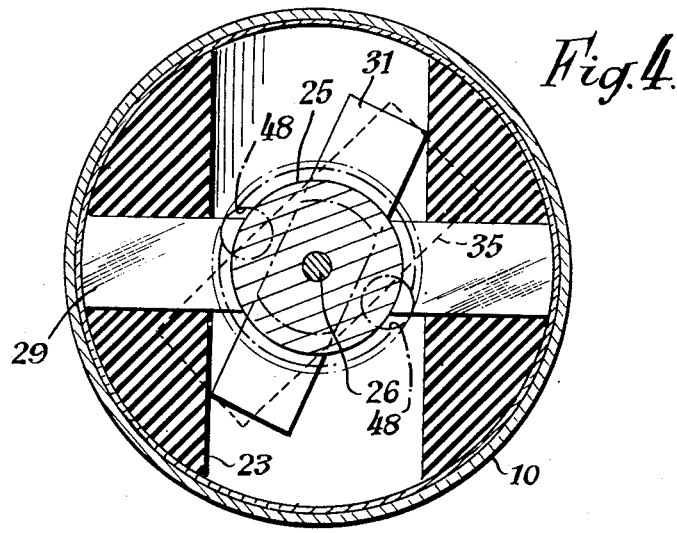
Figure 4 is a section on the line 4—4 of Figure 1, the magnet element of the magnetic coupling being shown in dotted lines and the switch parts in chain-dotted lines.

The switch mechanism shown in the drawings is intended for use in association with a liquid-containing tank, the switch being used to control an electric circuit to operate an indicator, or to open or close a valve, in accordance with changes of level of liquid in the tank, the magnetic coupling enabling the switch itself to be separated from the liquid in the tank by a diaphragm separating the two elements of the said coupling.

Referring to the drawings, the switch mechanism is housed in a tubular casing 10 of non-magnetic metal fixedly mounted in a sleeve 11 carrying a flange 12 apertured for the passage of bolts (not shown) by means of which the mechanism may be secured to a wall 13 of a tank. A cup-like shell 14, also of non-magnetic metal, fits closely in the casing 10, the closed end 15 of the cup-like shell constituting a transverse partition dividing the interior of the casing into an inner compartment 16 and an outer compartment 17. Both the casing 10 and the shell 14 are deformed to provide longitudinal ribs 18 and 19 (Figures 1 and 2), the rib 19 fitting inside the rib 18 to prevent relative rotation of the two parts. A switch block or stator 21, formed of electrically insulating material is mounted in the shell 14, a rib 22 on the block 21 entering the rib 19 to prevent rotation. The block 21 has a diametral groove 23 extending across its end which faces the partition 15, and a cylindrical recess 24, co-axial with the block, opens into the slot. A switch rotor 25 is mounted on a spindle 26 supported in bearings 27 and 28, one in the closed end of the recess 24, and the other in a bar 29 extending across the groove 23. The rotor 25 carries a bar-like armature 31 of magnetic metal, lying in the groove 23, the armature 31 being narrower than the groove, so that it is free for limited angular movement about a mean position in which it lies parallel to the groove.

A disc-like head 32, secured by radial screws 33 in the inner end of the casing 10, is apertured centrally to form a bearing for a shaft 34 co-axial with the spindle 26. On the end of the shaft 34 within the casing 10 is mounted a permanent magnet 35 of horse-shoe form having its poles 36 and 37 lying on opposite sides of a diametral line through the axis of the shaft 34. On the end of the shaft 34 outside the casing is mounted a radial arm 38 carrying a float 39, angular movement of the arm 38 being limited by adjustable stops 41 and 42 (Figure 3) in the form of screws mounted in lugs 43 and 44 on the head 32. The stops 41 and 42 are so positioned that the arm 38 moves angularly about a mean position perpendicular to the groove 23.

The switch rotor 25 is formed with a circumferential groove 45 intersected by two diametrally opposed longitudinal grooves 46 and 47, in each of which is located a waisted roller 48, the two rollers 48 being urged outwardly against the cylindrical wall of the recess 24 by a resilient ring 49 mounted in the groove 45 and engaging the waists of the rollers. The rollers 48 co-operate with fixed contacts embedded in the switch block 21 and having surfaces lying on the wall of the recess 24, each roller 48, in one position of the rotor 25, bridging fixed contacts. As shown in Figure 2, one roller 48 is in a position to connect a fixed contact 50 in the plane of the section to another fixed contact 51 in the plane of the other end of the roller, the other roller 48 being, with the parts in that position, out of engagement with a corresponding pair of contacts 52 and 53 which it bridges when the rotor is turned to its other extreme position. Binding posts 54 mounted in the block 21 receive cables connected to the fixed contacts, the binding posts being accommodated in a recess 55 in the outer end of the block 21, which recess is closed by a cap 56 screwed on to the sleeve 11.

In Figures 1, 2 and 3, the parts are shown in the positions which they take up when the float 39 is unsupported, and Figure 4 shows the relative positions of the magnet 35 and the armature 31 when the parts are in these positions. It will be observed that the magnet 35 lies at a greater angle to the centre line of the groove 45 than does the armature 31, so that the attraction between the magnet poles and the armature holds the ends of the armature against the sides of the groove.

Figure 5:
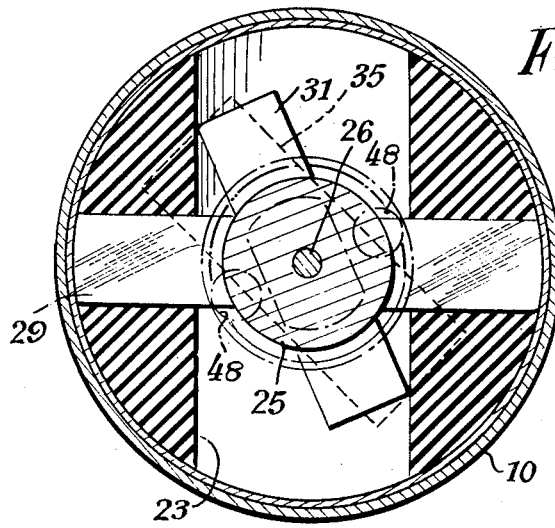
Figure 5 is a section corresponding to Figure 4, but showing the parts of the magnetic coupling and switch in another position.

Upward movement of the float 39 causes the magnet 35 to move clockwise from its position in Figure 4, so that the armature 31 is unable to follow the movement of the magnet, the force of attraction decreasing until the magnet reaches a position at right angles to the armature, after which it acts on the armature with increasing intensity in the opposite direction until the magnet reaches the position shown in Figure 5. At some time after the magnet has passed the position at right angles to the armature, the reversed force of attraction becomes sufficient to start movement of the armature towards the position shown in Figure 5, and, since that movement brings the armature ends nearer to the poles of the magnet, the attraction increases during the movement, and the switch is operated with a snap action.

The switch shown in the drawings has two pairs of fixed contacts and two moving contact elements, so that it closes one electrical circuit in one position, and closes another electrical circuit in the other position. For a simple make-and-break switch, only one pair of fixed contacts and one moving contact element may be provided, and other combinations of contacts may be provided to suit the circuit arrangements.

The float need not be directly mounted on an arm on the shaft 34, but may be coupled to the shaft in any desired manner. An operating member other than a float may be used.

I claim:

1. An electric switch mechanism comprising a rotary switch and a magnetic coupling device through which the switch is operated, the magnetic coupling device comprising a magnet element and an armature element movable about co-axial pivots, an operating member coupled to one element of the magnetic coupling device to effect rotation thereof through a predetermined angle, a rotor forming part of the rotary switch and coupled to the other element of the magnetic coupling, and means for limiting the two elements of the magnetic coupling to angular movement about mean positions at right angles to each other.

2. An electric switch mechanism according to claim 1, wherein the switch rotor is mounted concentrically in a cylindrical recess in a switch block, and carries one or more longitudinally extending contact elements adapted to bridge longitudinally spaced contact areas in the circumferential wall of the recess.

3. An electric switch mechanism according to claim 2, wherein the contact elements comprise waisted rollers mounted in longitudinal grooves in the switch rotor and urged outwardly by a resilient ring housed in a circumferential groove intersecting said longitudinal grooves.

4. An electric switch mechanism comprising a driven element, means mounting said element for angular movement about a predetermined axis, means restricting said movement to a predetermined range less than 180°, a driving element mounted for angular movement about said axis, means restricting said movement of the driving element to a range outside that of the driven element and having its limits adjacent to those of the driven element, one of said elements comprising a magnet establishing a magnetic coupling with the other said element whereby angular movement of the driving element from one limit of its range to the other will cause angular movement in an opposite direction of said driven element.

5. An electric switch mechanism comprising a driven element, means mounting said element for angular movement about a predetermined axis, means restricting said movement to a predetermined range, a driving element mounted for angular movement about said axis, means restricting said movement of the driving element to a range outside that of the driven element and having its elements adjacent to those of the driven element, one of said elements comprising a magnet establishing a magnetic coupling with the other said element whereby angular movement of the driving element from one limit of its range to the other will cause angular movement in an opposite direction of said driven element.

6. The combination of claim 5 wherein one of said elements consists of a permanent magnet having its poles disposed symmetrically on opposite sides of said axis.

7. The combination of claim 6 wherein one of said elements consists of a permanent magnet having its poles disposed symmetrically on opposite sides of said axis, the other said element having similarly disposed magnetically attractable portions for establishing a coupling with said magnetic poles.

References Cited in the file of this patent

UNITED STATES PATENTS

| | | |
|---|---|---|
| 2,133,980 | Fowler | Oct. 25, 1938 |
| 2,298,573 | Little | Oct. 13, 1942 |
| 2,620,412 | Ford | Dec. 2, 1952 |